Patented Nov. 11, 1924.

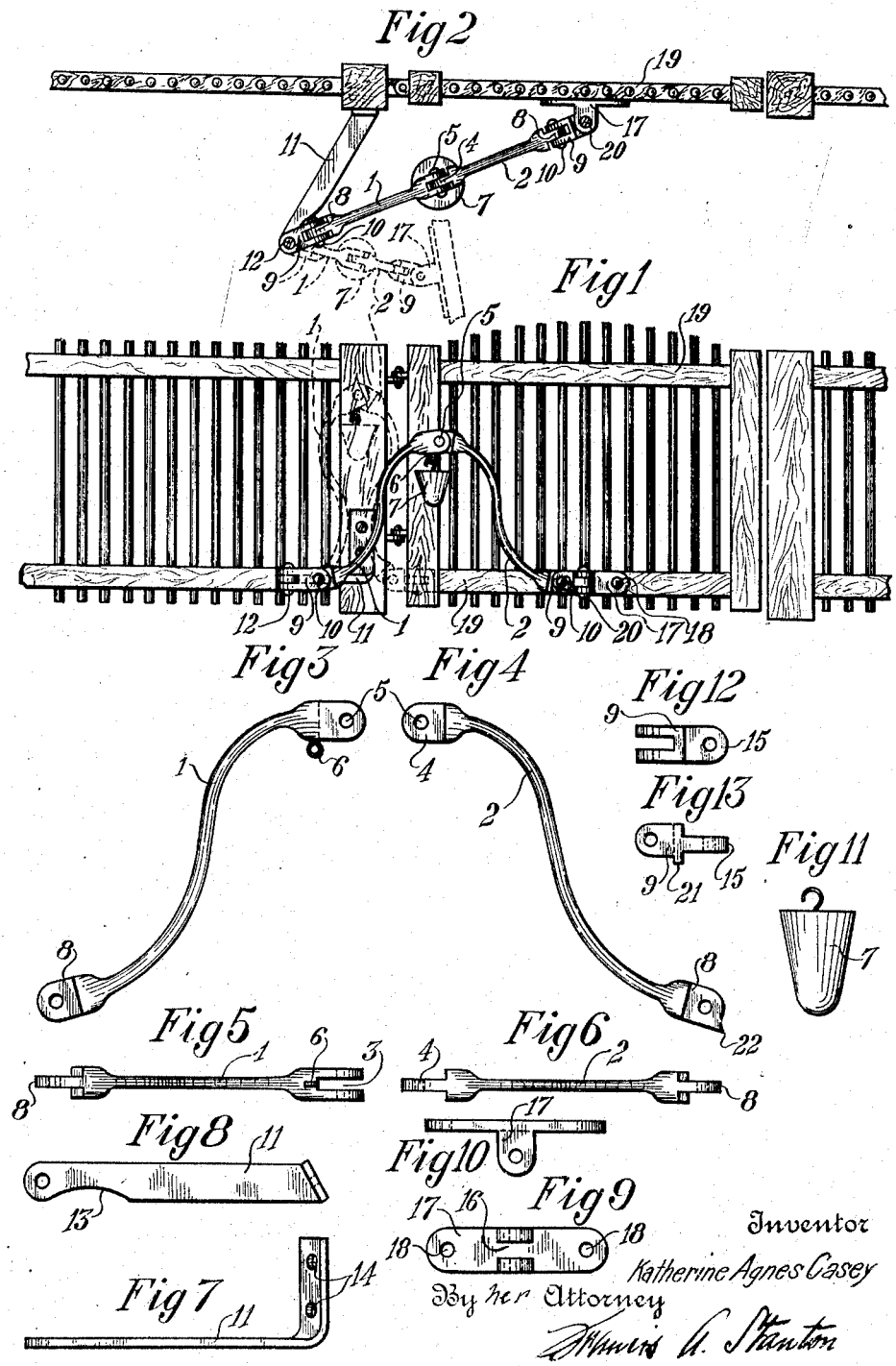

1,514,830

UNITED STATES PATENT OFFICE.

KATHERINE AGNES CASEY, OF LYNBROOK, NEW YORK.

GATE ADJUSTER.

Application filed June 5, 1923. Serial No. 643,573.

*To all whom it may concern:*

Be it known that I, KATHERINE AGNES CASEY, citizen of the United States of America, and a resident of Lynbrook, in the township of Hempstead, in the county of Nassau, State of New York, have invented an Improvement in Gate Adjusters, of which the following is a specification.

The invention relates to a novel, improved and efficient combination of means which regulates the ready opening and secure closing of gates and similar mechanisms which permit of ingress and egress. The invention consists in the novel parts, constructions, arrangements and combinations embracing the improvements shown and described herein. Details of the invention and its application are hereinafter described and illustrated in the accompanying drawings, and it should be understood that in so describing the principles thereof, I do not thereby intend to limit the same other than as the same is defined by the scope of the appended claim.

In the drawing: Fig. 1 shows, in full, the gate adjuster when the gate is closed and, dotted in, the gate adjuster when the gate is open.

Fig. 2 is a top view of Fig. 1.

Figs. 3 and 4 show the two connecting bars, Fig. 5 being a top view of Fig. 3, and Fig. 6 a top view of Fig. 4.

Fig. 7 is front view of the bracket arm; Fig. 8 a top view thereof.

Fig. 9 shows the movable bracket arm and Fig. 10 top view thereof.

Fig. 11 shows the counterweight.

Figs. 12 and 13 are detail views of the universal joint used in combination with the movable bracket arm.

The invention provides a simple mechanism which can be attached to large or small gates. It is simple of adjustment, and once connected, practically permanent, and requires little or no attention. The mechanism can be attached to single or double gates, whether made of iron, wood or other material, and obviates the necessity of any accessory fastenings, such as catches or locks. When in use, it permits of the easy opening and the secure shutting at all times, as well as permitting of the adjustment of the point at which it will automatically stay open.

It is particularly advantageous for use in municipalities wherein it is prohibited to allow gates to project on to the sidewalks, as the outward swinging of the gate by pressure of the wind or other causes is impossible where my adjuster is employed.

There is little or no increased pressure necessary to open the gate, as it swings through its orbit, whereas in the commonly employed springs the snap-back pressure is increased the further the gate is swung open.

The bars 1 and 2 shown in the drawings are preferably goosenecked, for the purposes hereinafter described, bar 1 having a recessed portion 3 at its upper end into which projects extending flange 4 of bar 2, the two bars being connected by a bolt or loose rivet 5, about which they are free to move.

Permanently attached to bar 1 is the bracket or ring 6, or similar device, so that the counterweight 7, shown in Fig. 11 may be securely attached thereto. The lower portions of the bars 1 and 2 have flanged extending portions 8, which are attached to the couplings 9 and pinned thereto by the bar or rivet 10 in a manner to permit freedom of rotation about said pin. The coupling to which the lower portion of bar 1 is attached is connected to the permanent bracket 11 by means of a nut and bolt or other suitable mechanism 12, in such a manner that the coupling is free to rotate in a vertical plane. Bracket 11 is recessed at its portion 13 in any sufficient degree so as to permit the further rotation of the coupling and the gooseneck bar 1 to the extent required, bracket 11 being permanently fastened to the post or the fence or other suitable monument by means of its bracketed arm, and screwed or nailed thereto, as shown at 14.

The coupling, to which the flanged portion of gooseneck bar 2 is attached, has a flange 15 which projects into the opening 16 in the bracket 17, shown in Figs. 9 and 10. The bracket 17 is secured by means of nails, bolts or other suitable means 18, to the swinging gate 19, and the coupling is free to rotate in a horizontal plane about the rivet or bolt 20, by which it is attached to said bracket.

In Fig. 13 it will be noticed that this coupling has a shoulder 21, which projects downward. In Fig. 4 it will be noticed that the flanged extension, the bottom part of gooseneck bar 2, has a shoulder 22 at its lowest portion, so that as the gooseneck bar 2 revolves vertically about the rivet or stud 10, the shoulder portion 22 will come in contact with the shoulder 21, and this point of contact can be arranged or adjusted by increasing or diminishing either the shoulder 22 or the shoulder 21, and that when these two shoulders come into contact, it is impossible to further move the bar in its vertical orbit, and consequently the gate is in a locked position. By the adjustment of the bracket 17 on the gate 19, this locked position may be made to result, when the gate is truly closed.

The counterweight 7 attached to the rivet 6 tends at all times to swing the gooseneck bar toward the gate in its vertical orbit about the pin 10 by which it is attached to the coupling, unless the bar has been raised to such a position that it is in dead center, as is shown in Fig. 1. It will thus readily be seen that the gate when opened so far can move no further and is then locked. This position of locking the gate, or in other words, holding it open, can be regulated by simple adjustment when attaching the improved device to the gate.

The couplings, in conjunction with the bars, comprise universal joints, and thus permit of the ready and easy attachment to all classes of gates and the easy movement when placed thereon.

It will be readily seen that with the bracket 11 permanently secured to the post, that when the shoulders 22 and 21 are in mutual contact, no further movement of the goosenecked bars 1 and 2 is possible, and consequently the gate is securely locked in a shut position, and that when the counterweight is in dead center position no further movement of the goosenecked bars is possible and the gate is securely held open at the position desired.

It is understood that the foregoing description of my invention, whilst explanatory, is not restrictive within the proper field of novelty and equivalency of invention; and it should be understood that departures may be made from the exact structures and arrangements herein shown and described without departing from the principles of the invention, and without sacrificing its chief advantages, and I claim all the changes and modifications which legitimately come within the principles of my invention and the scope of the claim.

I claim:

A gate adjusting mechanism comprising two goose-necked bars pivotally connected at their upper ends, a shoulder downwardly projecting from the lower end portion of one of said goose-necked bars, couplings adapted to be attached to the lower end portions of said bars and about which the goose-necked bars are each movable in a vertical plane, a projecting portion of one of said couplings adapted to engage said projecting shoulder on the lower end of one of said bars at the point of furthest throw of the gate and thus lock the gate in its closed position, brackets to which said couplings are attached and about which the couplings are free to move in a horizontal plane, a recessed portion of one of said brackets to permit of horizontal swing of the coupling sufficient to drop the elevation of the goose-necked bars so that the projecting portion on the other coupling engages the aforesaid shoulder portion on the lower end of one of said goose-necked bars at the point of furthest throw of the gate and a gravity actuated weight attached to one of said goose-necked bars for the purpose of swinging the said goose-necked bar in its vertical orbit toward the gate and cause the throw of the gate thereby, said goose-necked bars permitting of backward swing to the dead center position of said gravity weight and being held there by said weight, thus locking the gate in its open position.

In testimony whereof, I have signed my name to this specification this 17th day of April, 1923.

KATHERINE AGNES CASEY.